United States Patent [19]

Ohya

[11] Patent Number: 4,880,267
[45] Date of Patent: Nov. 14, 1989

[54] BACK DOOR STRUCTURE FOR A MOTOR VEHICLE

[75] Inventor: Takeji Ohya, Hiroshima, Japan

[73] Assignee: Mazda Motor Corporation, Hiroshima, Japan

[21] Appl. No.: 97,095

[22] Filed: Sep. 16, 1987

[30] Foreign Application Priority Data

Sep. 17, 1986 [JP] Japan .................................. 61-218628
Sep. 17, 1986 [JP] Japan .................................. 61-218629

[51] Int. Cl.⁴ .............................................. B62D 25/10
[52] U.S. Cl. ........................................ 296/56; 296/146
[58] Field of Search ................... 296/106, 56, 76, 146; 49/339, 340

[56] References Cited

U.S. PATENT DOCUMENTS

| | | | |
|---|---|---|---|
| 4,261,610 | 4/1981 | Inamoto | 296/146 X |
| 4,341,414 | 7/1982 | Chiba | 296/56 |
| 4,343,504 | 8/1982 | Tomioka et al. | 296/106 X |
| 4,679,841 | 7/1987 | Taunay | 296/106 X |

FOREIGN PATENT DOCUMENTS

| | | | |
|---|---|---|---|
| 2581938 | 5/1986 | France | 296/146 |
| 0164811 | 10/1982 | Japan | 296/106 |
| 60-124719 | 8/1985 | Japan . | |

*Primary Examiner*—Johnny D. Cherry
*Assistant Examiner*—Joseph D. Pape
*Attorney, Agent, or Firm*—Fleit, Jacobson, Cohn, Price, Holman & Stern

[57] ABSTRACT

A back door structure for a motor vehicle in which a back door is hingedly mounted on a vehicle roof for movement between an open and closed position. The back door is of trapezium configuration, with its lower portion wider than its upper portion. A stay damper is connected with the back door at one end and connected with a rear pillar at the other end. The stay damper biases the back door to a raised open position and is disposed between the rear pillar and the back door when closed. The stay damper moves outwardly in accordance with the opening of the back door. The back door includes a frame member disposed along the side peripheral edges of the back door window glass. A conceal member is connected with the frame member and extends outwardly, forming the rear corners of the vehicle body and concealing both the stay damper and the rear pillar. The conceal member constitutes a portion of the outer surface of the vehicle body. The side margins of the window glass are extended to the outside of the back door frame member so the car design becomes more flexible. Moreover, the rear pillar is covered by the conceal member, and the vehicle appearance is greatly improved.

19 Claims, 8 Drawing Sheets 3-3

4-4

5-5

6-6

BACK DOOR STRUCTURE FOR A MOTOR VEHICLE

BACKGROUND OF THE INVENTION

1. Field of the Invention

The present invention relates to a back door structure for a motor vehicle, specifically to a back door structure having a stay damper to bias the back door to the open position.

2. Description of the Invention

A motor vehicle with a back door having an opening position and a closing position, including a stay damper to bias the back door to the opening position, is disclosed in Japanese Utility Model Public Disclosure No. 60-124719, filed Jan. 31, 1984, and laid open to the public on Aug. 22, 1985.

The stay damper is disposed between a rear pillar and a frame member of the back door and extends along the rear pillar when the back door is closed. For the motor vehicle described above, it is desired to have a window glass mounted on the back door that has a large area extending outside of the back door frame.

Unfortunately, a difference in level exists between the rear pillar and a side end portion of the window glass because the stay damper is disposed between the back door and the rear pillar. If the window glass would extend outside of the back door frame, the vehicle's appearance would be adversely affected because of this level discrepancy.

Accordingly, it is apparent that in order to improve the vehicle's appearance, an outside portion of the rear pillar needs to be formed outside of a recess for housing the stay damper, arranged high so that the outer portion of the rear pillar comes close to the lower surface of the window glass. However, it is apparent that the back door is constituted wider at its lower portion than at its upper portion. Briefly, the rear pillar which constitutes an inner end portion of a back door opening leans or slants inwardly toward the inner space or front of the vehicle. Therefore, one end of the stay damper connected with the back door will move outwardly in accordance with the movement toward the opening position of the back door.

Accordingly, if the outside portion of the rear pillar which forms an outside boundary of the recess for housing the stay damper is arranged high, the outside portion of the rear pillar will interfere with the stay damper when the back door is opened.

SUMMARY OF THE INVENTION

It is, therefore, an object of the present invention to provide an improved back door structure in which a side portion of a window glass, mounted on a back door frame, extended outside of the back door frame without the vehicle appearance being adversely affected.

It is another object of the present invention to prevent interference between the outside portion of the rear pillar and the stay damper.

The above and other objects of the present invention can be accomplished by a back door structure comprising a back door hingedly mounted on a vehicle roof for movement between positions opening and closing a back door opening. The door and the opening and both of a trapezium configuration, with the lower portion wider than the upper portion.

A stay damper is connected with the back door at one end and connected with a rear pillar of the vehicle frame at the other end. The stay damper biases the back door to a raised open position and is disposed between the rear pillar and the window glass, extending along both when in the door closed position. The stay damper moves outwardly when the back door opens.

The back door includes a frame member that lies disposed along the peripheral inner surface of the window glass. A conceal member is connected with the back door frame member and extends outwardly of the vehicle to conceal both the stay damper and the rear pillar of the vehicle frame and further constitutes the outer surface of the vehicle body, overall providing a very pleasing effect.

According to the present invention, the side marginal portions of the window glass can be extended to the outside edge of the back door frame, while maintaining and preserving an excellent, aesthetically pleasing vehicle appearance. The outside portion of the rear pillar which forms a boundary of the recess for housing the stay damper can be arranged low to prevent interference between the stay damper and the rear pillar when opening the back door.

BRIEF DESCRIPTION OF THE INVENTION

Figure 1:
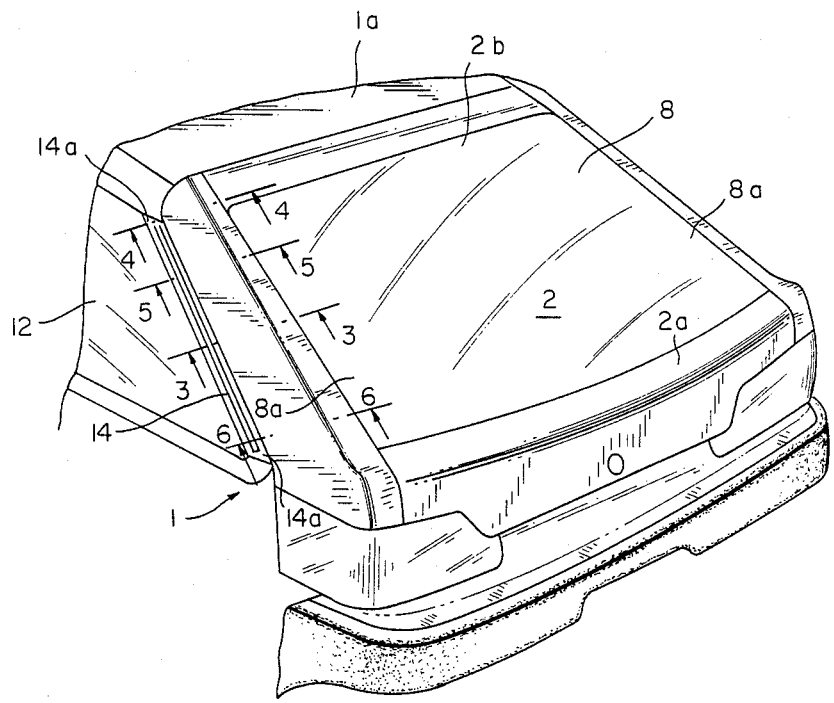
FIG. 1 is a rear view in perspective of a motor vehicle showing the novel back door structure of the present invention.

FIGS. 3, 4, 5, and 6 are sectional views taken along the lines 3—3, 4—4, 5—5, 6—6, respectively, of FIG. 1.

Figure 3:
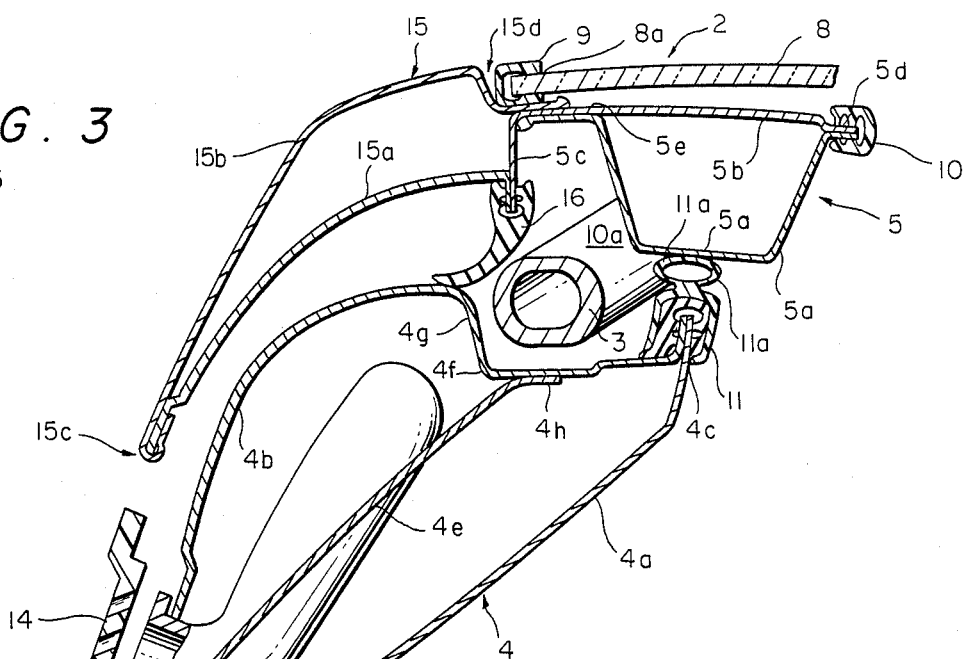
Figure 4:
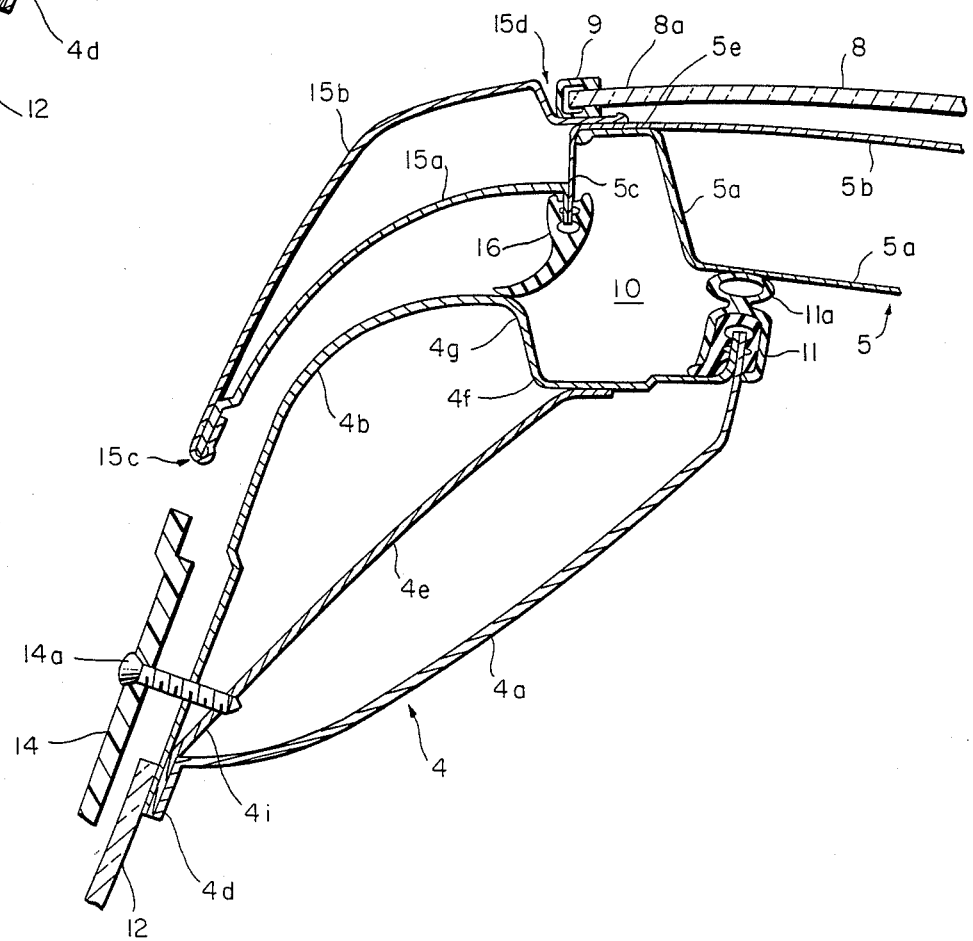
Figure 5:
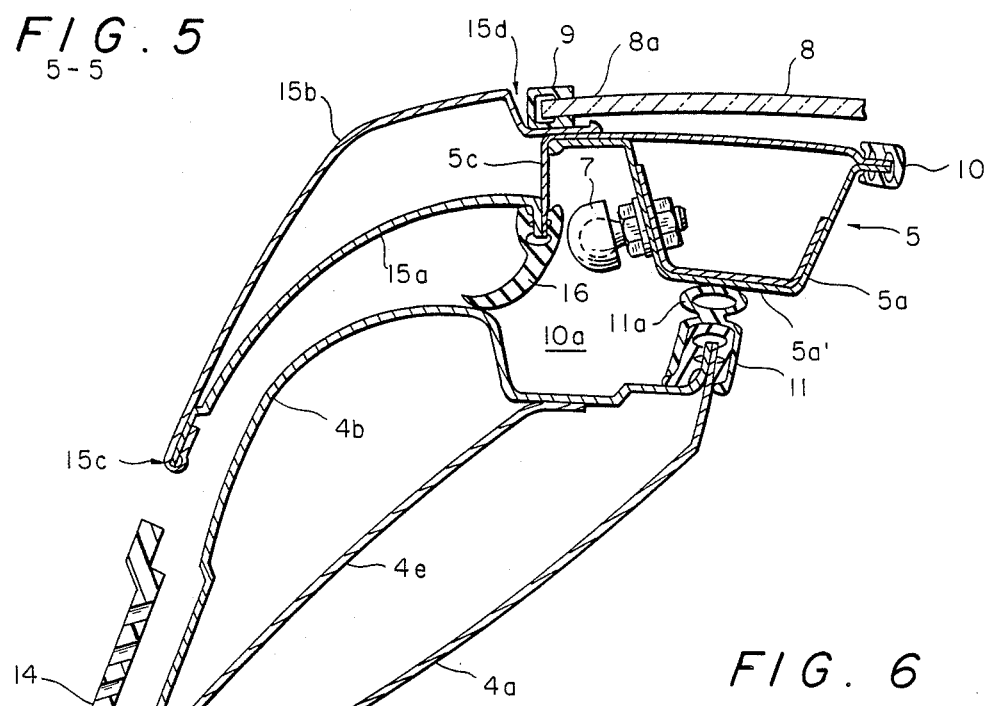
Figure 6:
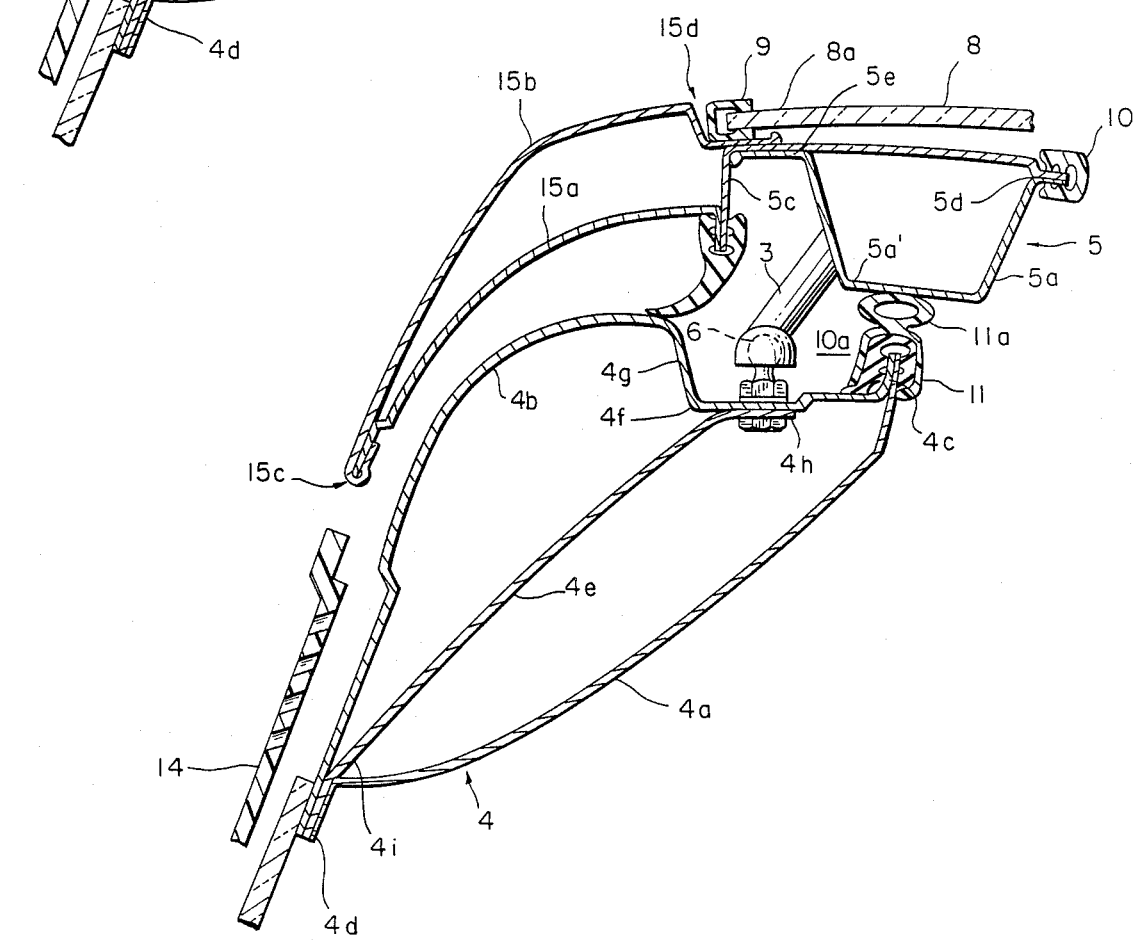
Figure 7:
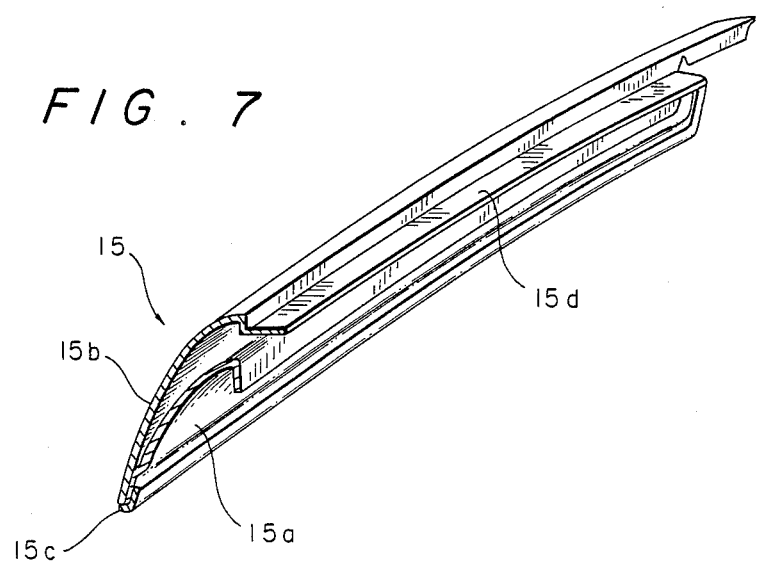
Figure 8:
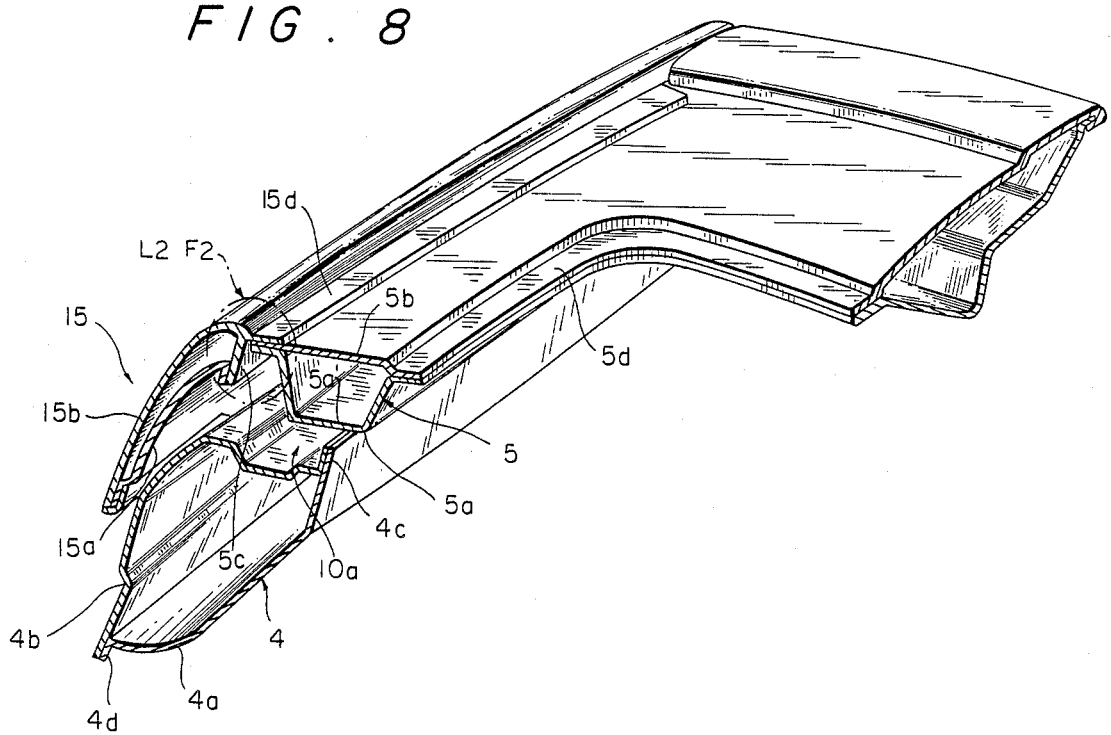
Figure 9:
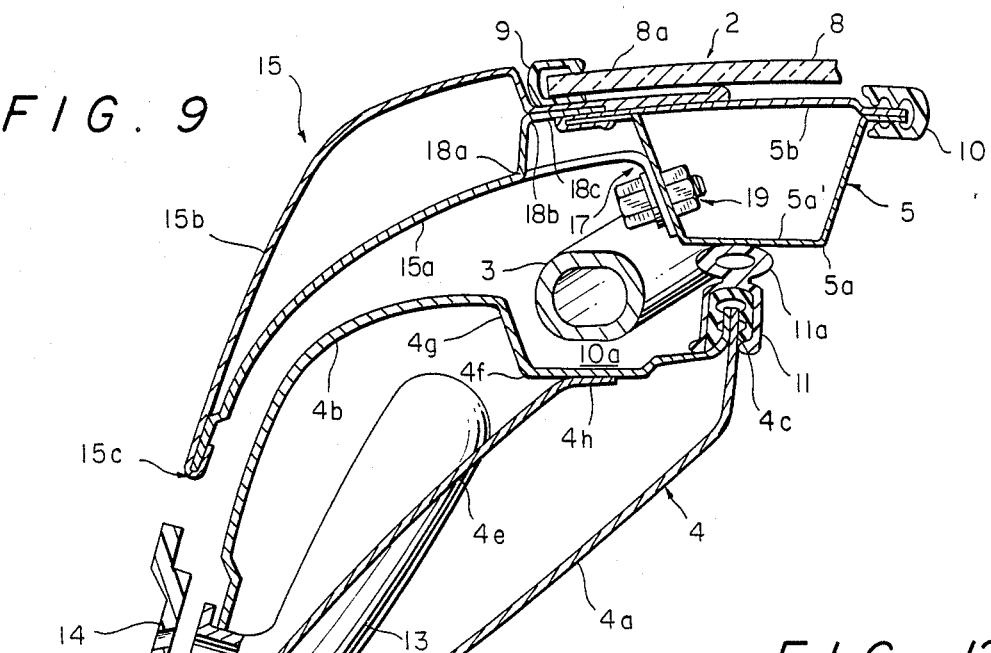
Figure 10:
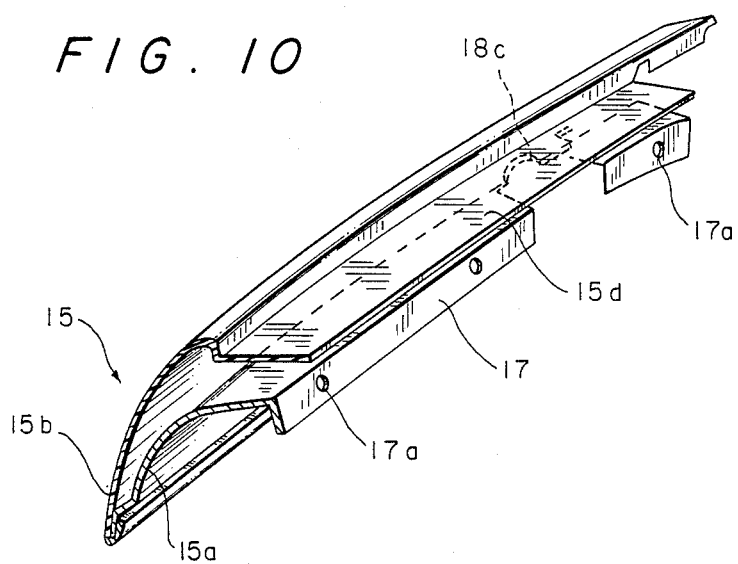

FIG. 7 is a perspective view of the novel conceal member;

FIG. 8 is a perspective view partly in section showing the novel back door structure;

FIG. 9 is a view similar to FIG. 3, but showing a second embodiment;

FIG. 10 is a view similar to FIG. 7, showing the second embodiment.

Figure 11:
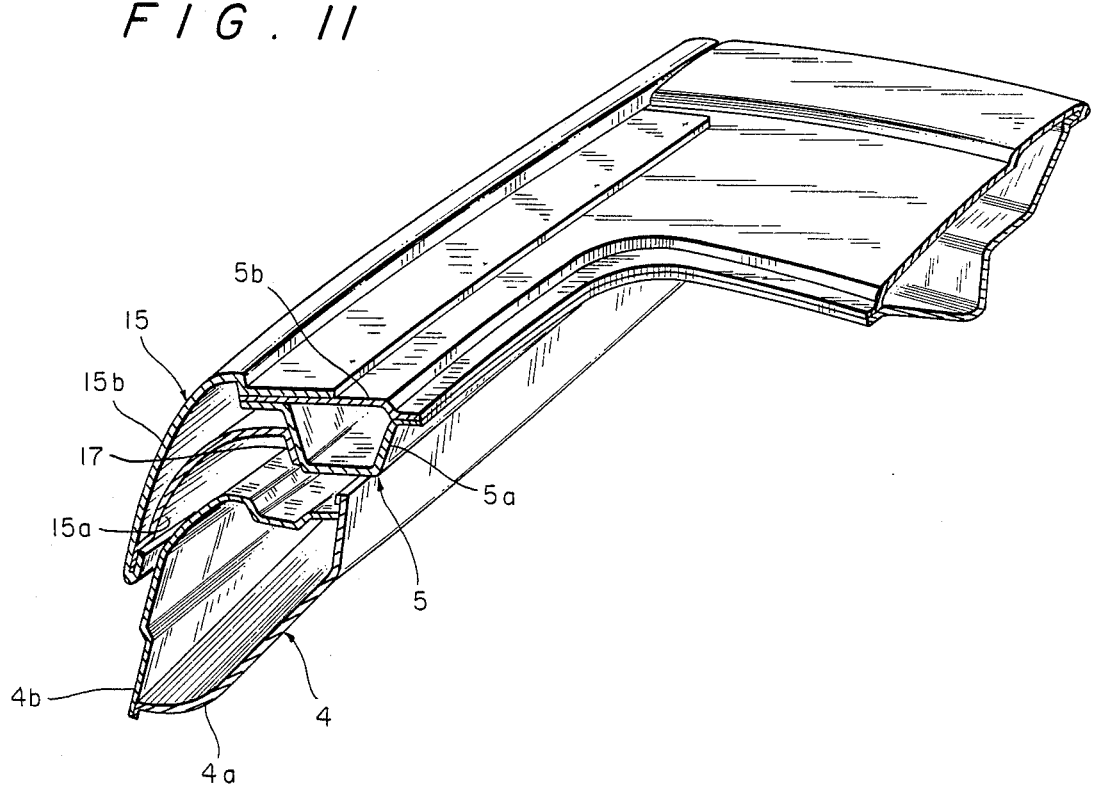

FIG. 11 is a view similar to FIG. 8, showing the second embodiment.

Figure 12:
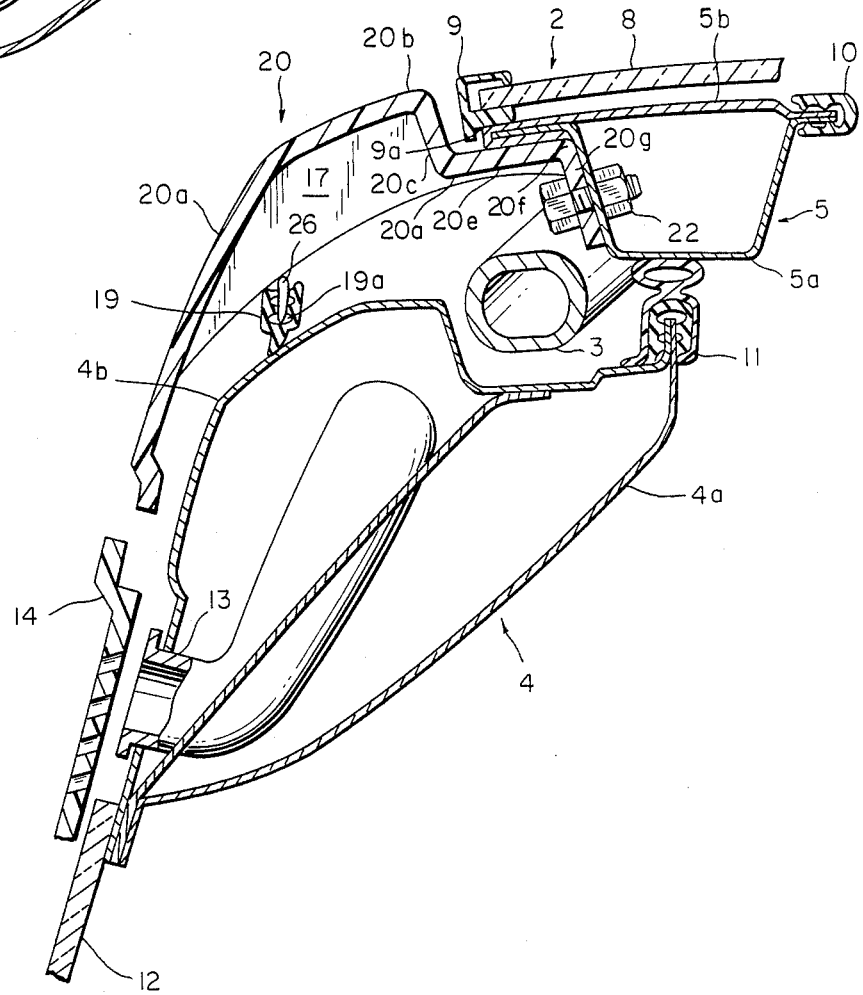

FIG. 12 is a view similar to FIG. 3, but showing a third embodiment.

Figure 13:
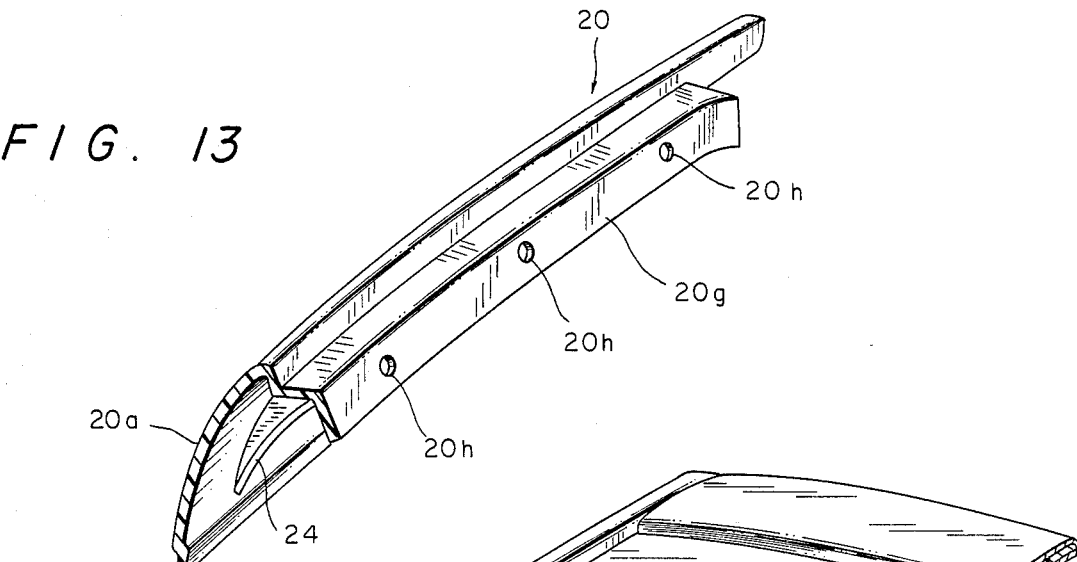

FIG. 13 is a view similar to FIG. 7, showing the third embodiment.

Figure 14:
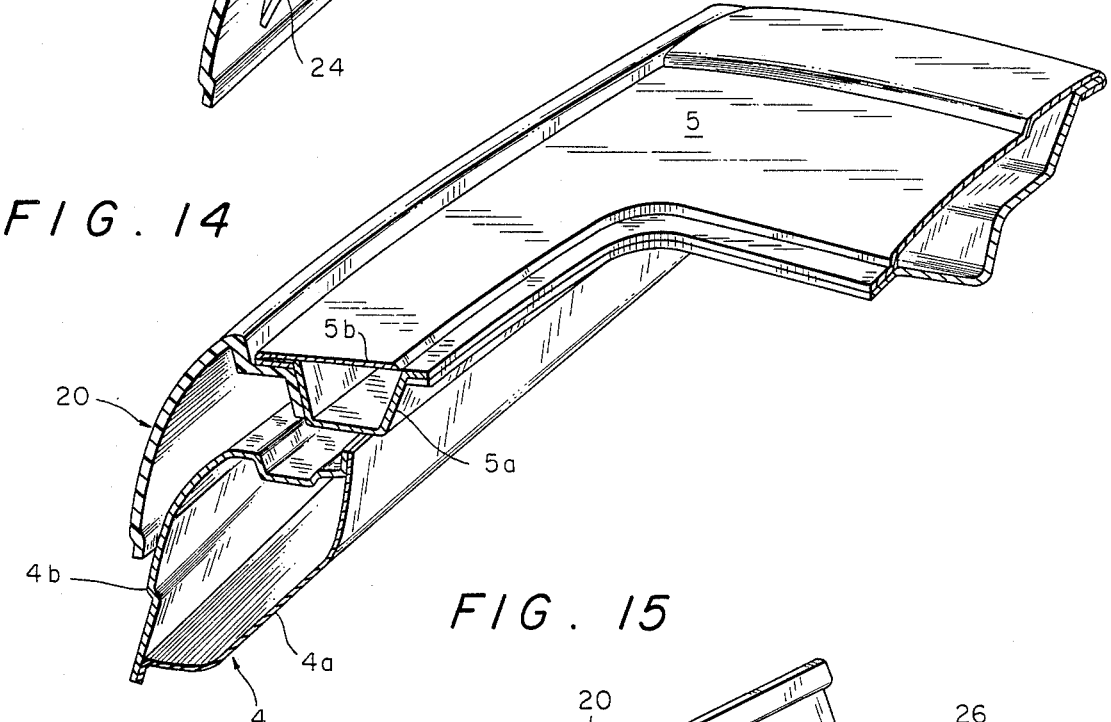

FIG. 14 is a view similar to FIG. 8, showing the third embodiment; and

Figure 15:
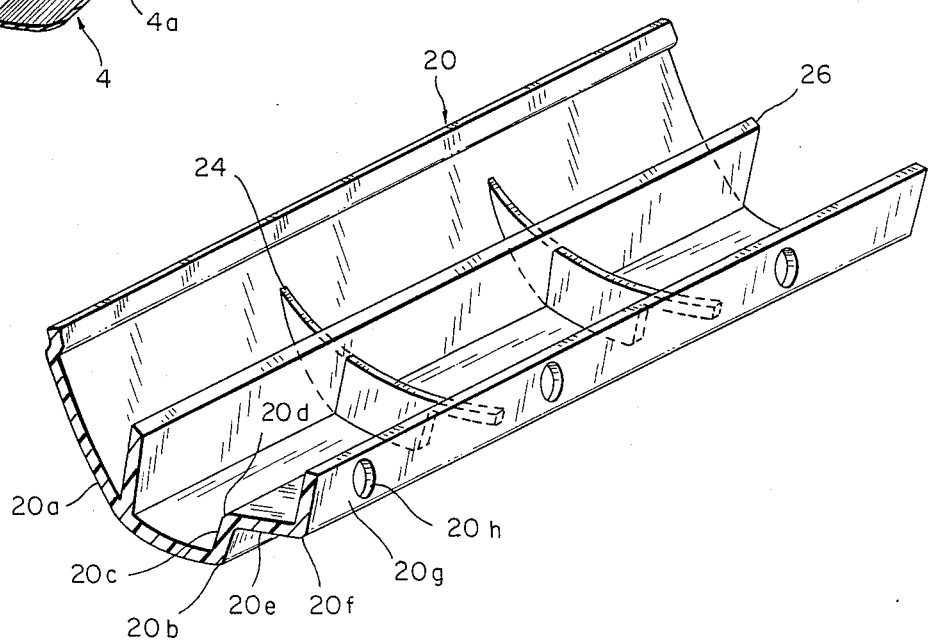

FIG. 15 is a partial perspective view of the conceal member of the third embodiment showing the undersurface.

DETAILED DESCRIPTION OF THE PRESENT INVENTION

Figure 2:
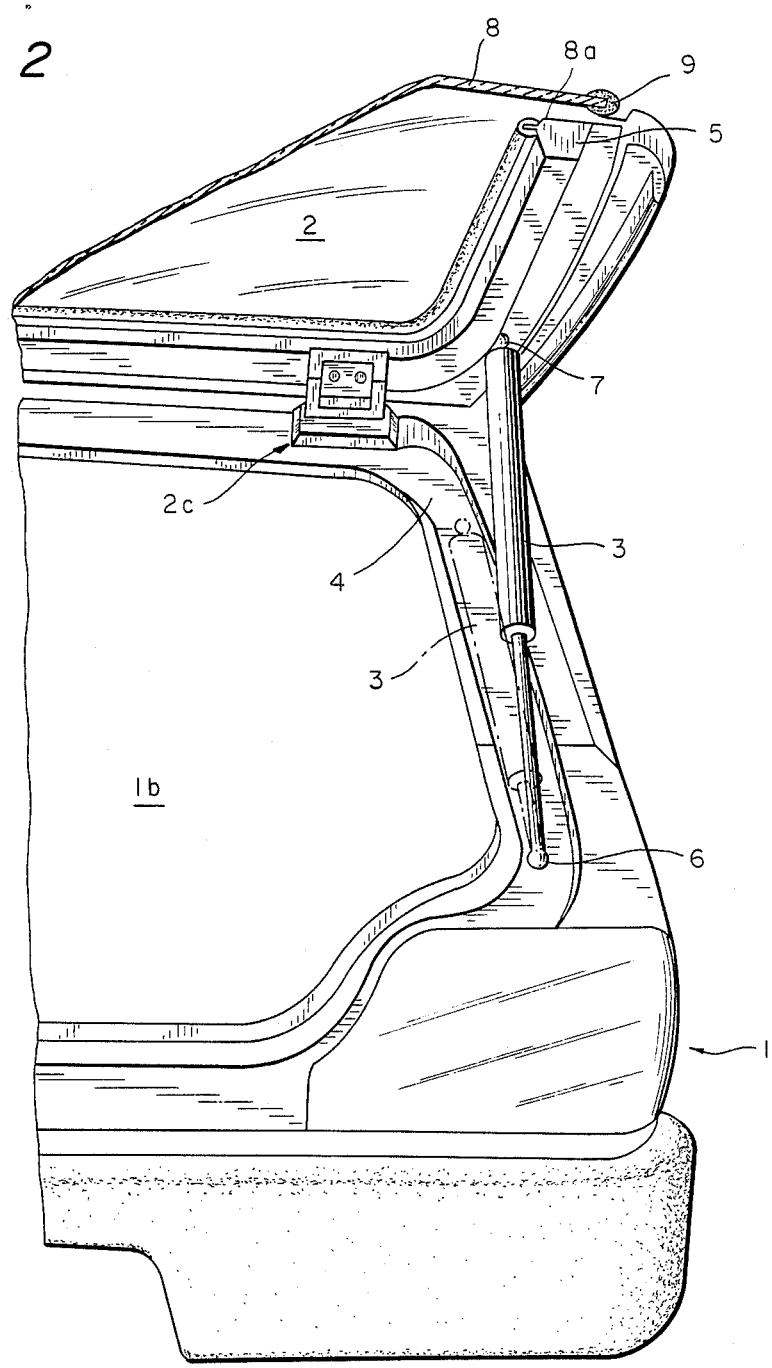
FIG. 2 is a perspective view of FIG. 1 showing the back door open.

Now referring to FIGS. 1 to 8, a preferred embodiment of the present invention is shown. As shown in FIGS. 1 and 2, vehicle 1 consists of a back door 2 hingedly mounted 2c in a conventional way onto vehicle roof 1a for movement between a closed position, as shown in FIG. 1, and an open position, as shown in FIG. 2, which exposes vehicle opening 1b. The back door 2 is of a trapezium configuration with lower portion 2a wider than upper portion 2b and with the door tilted relative to the longitudinal horizontal and vertical planes of the vehicle so the upper portion 2b lies more forward than lower portion 2a. A stay damper 3 is disposed between a rear pillar 4 of the vehicle frame and a back door frame member 5, and extends in the door closed position, along both of them as shown in dash-dot lines. The stay damper 3 is connected with member 5 of the back door 2 at one end 7 by a conventional pivotal connection and connected with the rear pillar 4 at the other end 6 by a conventional pivotal connection. The stay damper biases the back door 2 to a raised open position, as shown in FIG. 2. As shown in FIG. 1, the back door 2 extends around the rear corners of the vehicle and terminates just behind the rear windows 12 of the vehicle, only one of which is shown in FIG. 1. Between the back door 2 and rear windows 12 is a grill 14 (ex grille), which is attached to the vehicle frame by self-tapping screws 14a (see FIGS. 1 and 4) and slightly overlaps window 12.

Referring particularly to FIGS. 3–8, a window glass 8 is mounted on the back door frame 5 to cover the largest possible surface of the back door 2. Side marginal portions 8a of the window glass extend outwardly to coincide with outer marginal end or side portions of the back door frame 5. The window glass 8 is framed by contacts a C-shaped decorative molding 9, which extends around the edge of the window glass 8 and contacts the inner and outer surfaces of glass to provide a finished structure and protection for glass 8.

In the following description, the terms "forward" and "rear" refer to the front and back of the vehicle, respectively. The terms "inner" and "outer" refer to toward the vehicle interior and exterior, respectively. The frame member 5 comprises an inner or forward panel 5a and an outer or rear panel 5b connected together along opposite side or marginal edges 5d and 5e to form a box structure of closed trapezoidal cross-section. Inner side edges 5d of the frame member 5 are covered by an edge garnish molding 10. The rear pillar 4 of the body frame comprises an inner panel 4a and an outer panel 4b connected together along opposite marginal side edges 4c and 4d to form a box structure of closed cross-section. A central strut or support panel 4e is secured to an intermediate part of panel 4b at rear or inner end 4h and connected to outer or forward marginal side edges 4d being sandwiched between them. Connected inner marginal side edges 4c of the rear pillar 4 extend upwardly and is fitted with a U-shaped weather strip 11 provided with a bead 11a that contacts with the smaller base portion 5a' of inner panel 5a of the frame member 5 when the back door 2 is closed and provides a seal between the vehicle cabin interior and the outside. Connected outer marginal side edges 4d of the rear pillar 4 supports and is fixed to side glass 12. An exit of tube 13 for ventilating the cabin interior with the outside is supported by panel 4b. The exit of tube 13 is covered by a grill 14 supported in any known manner. The margin edge 5c of outer panel 5a and is bent 90° toward the vehicle interior and rear pillar 4.

A conceal member 15 is fixed to the frame member 5 and extends around the back corners of the vehicle covering the outer panel 4b of the rear pillar 4. The conceal member 15 comprises an inner panel 15a and an outer panel 15b connected together at 15c along their forward or outer side marginal edges to form a box of closed cross-section. Panel 15b is wrapped around the edge of panel 15a and crimped or beaded. The rear or outer end 15d of panel 15b is mounted and secured to the outer surface of panel 5b of the frame member 5 just above the joint 5e between panels 5a and 5b and beneath decorative molding 9. The rear or inner edge of inner panel 15a is bent at 90° toward the vehicle interior to overlie edge 5c and is secured to edge 5c. A seal strip 16 is fitted over the joint between edge 5c and the rear or inner edge of inner panel 15a and resiliently bears against panel 4b to provide a protective seal.

Stay damper 3 is disposed in a space or chamber 10a defined between the outer edge of the back door 2 and the inner edge of the rear pillar 4, which lies beneath or forward of frame member 5. It is appreciated, however, that both rear pillar 4 and frame member 5 are tilted or slanted upwardly and forwardly; thus the frames of reference, although accurate in the whole, are best applied for a given horizontal plane. As best seen in FIG. 3, inner panel 5a is of trapezoid shape and is closed by flat outer panel 5b, which extends beyond panel 5a, bends 90° to the forward or inner direction and extends inwardly or forwardly at 5c, creating a space between bent edge 5c and panel 5a. Panel 4b of rear pillar 4 is bent 90° to the rear or outwardly to form joint 4C and at a point spaced toward the exterior, bent 90° to the rear or outwardly at 4f, extends to the rear to form portion 4g and then is curved back to the front to form joint 4d. Thus, a space is created between joint 4c and portion 4g, which space together with the space between bent edge 5c and panel 5a form a chamber 10a to receive stay damper 3 when the back door 2 is closed. Strip seal 16 protects this space or chamber 10a when the door 2 is closed.

The rear or inner margin or edge 15d of panel 15b of the conceal member 15 is positioned by two bends to provide a lip for positioning the edge of window 8. Rear or inner edge 15d is secured to the panel 5b at the joint with panel 5a.

As described above, the side edges of the window glass 8 are extended to the outside of the frame member 5 to achieve a more fluid car design that covers the rear pillar 4 by the conceal member 15. In this manner the vehicle appearance is greatly improved. Also, the rear pillar 4 is covered by the conceal member 15 so that the outside or rearmost portion of the rear pillar 4 forms a recess for the stay damper 3 which is arranged low or forward to prevent interference between the stay damper 3 and the rear pillar 4 when back door 2 is opened.

Now referring to FIGS. 9, 10, and 11, a second embodiment of the invention is shown. The same parts as portrayed in the first embodiment are designated by the same reference numerals.

The rear or inner edge 17 of inner panel 15a is bent forward or inwardly at 90° and is extended to contact and overlie panel 5a. Apertures 17a are formed in edge 17 and complementary apertures are formed in panel 5a. Nut-bolt and washer assemblies 19 secure edge 17 to panel 5a. A longitudinal center portion of the inner edge 17 of inner panel 15a is bent 90° to the rear or outwardly at 18a and 90° toward the glass 8 at 18b to form a lip 18c to be secured in the joint between the rear edge 15d of panel 15b and the outer edge of panel 5b, which now terminates in the joint with the outer edge of inner panel 5a. As described above, the inner panel 15a of the conceal member 15 is connected rigidly with the frame member 5, thereby giving more rigidity to the back door 2 structure. In this embodiment, the stay damper 3 is disposed in a chamber 10a constituted by the U-shaped portion of panel 4b and a space provided by the outer portion of inner panel 5a and inner panel 15a of conceal member 15.

Now referring to FIGS. 12, 13, 14, and 15, a third embodiment of the invention is shown, where possible like parts are given the same reference numerals. As shown, a conceal member in the form of a garnish panel 20 is connected with the frame member by means of nut-bolt-washer assemblies 22. Panel 20 covers the outer panel 4b of the rear pillar 4. More specifically, the garnish panel 20 includes an outer surface 20a, which constitutes part of the vehicle body surface at the rear corners and extending forward. The rear of panel 20 is bent at 90° at 20b to go forward or inwardly to form portion 20c, bent at 90° at 20d to go toward glass 8 to form lip or ledge portion 20e and bent at 90° at 20f to go forward or inwardly to form margin or edge 20g that will overlie inner panel 5a. Bolt holes 20 are formed in edge 20g and complementary bolt holes 20R are formed in panel 5a.

Nut-bolt-washer assemblies 22 fasten edge 20g to panel 5a Ledge 20e underlies and supports the outer joint between edges of panels 5a and 5b. Decorative molding 9 is provided on extension 9a to conceal the joint between panels 5a and 5b. The forward or outer edge of panel 20 is given a decorative bead or beading.

The inner side of panel 20 is provided with spaced transverse ribs 24 extending front-to-back or out-to-in and a longitudinal rib 26 extending top-to-bottom and front-to-back. A seaming welt or seal 19 has one edge 19a of U-shaped configuration gripping rib 26 and its other edge resiliently bearing against panel 4b of the rear pillar 4 when the back door 2 is closed.

As described above, the garnish 20 can be molded out of any suitable plastic. The design is more flexible and the weight of the back door 2 is lighter.

Although the present invention has been described with reference to specific embodiments, changes will be apparent to those skilled in the art. Such changes are deemed to come within the purview of the invention.

I claim:

1. A back door structure for a motor vehicle comprising:
   a vehicle body having a rear pillar defining a back door opening of a trapezium configuration;
   a back door hingedly mounted on an upper part of said vehicle body for movement between an open and a closed position;
   said back door being of trapezium configuration with its lower portion wider than its upper portion and adapted in the closed position to cover and secure said back door opening;
   a stay damper pivotally connected with said back door at one end and pivotally connected with a rear pillar of the vehicle body at its other end to bias said back door to a raised open position and being disposed between said rear pillar and said back door in the closed position of said back door;
   said stay damper moving outwardly in accordance with the movement toward the open position of the back door;
   said back door including a back door window glass, a frame member having a closed cross-section disposed along the inner surface of a side peripheral edge of the back window glass, an outer edge of the fame member being substantially disposed inside the outer edge of the back window glass, and a concealment member connected with said frame member and extending outwardly around the rear corners of the vehicle body to conceal both said stay damper and said rear pillar and to constitute a portion of the outer surface of said vehicle body;
   said concealment member having a free end extending toward a side surface of said rear pillar and co-acting with a grill member to conceal said pillar.

2. A back door structure in accordance with claim 1, in which said concealment member has a closed cross-section.

3. A back door structure in accordance with claim 2, in which said frame member includes an outer panel and an inner panel, with an outer edge of said outer panel formed with an extension, said concealment member including an inner panel connected with said extension and an outer panel mounted on the outer panel of said frame member.

4. A back door structure in accordance with claim 1, wherein seal means are provided for protecting said stay damper.

5. A back door structure in accordance with claim 1, in which said concealment member includes a lip upon which said back door window glass is positioned.

6. A back door structure in accordance with claim 2, in which said frame member includes an outer panel and an inner panel, said concealment member includes an inner panel connected with said inner panel of said frame member, and an outer panel mounted on said outer panel of said frame member.

7. A back door structure in accordance with claim 6, in which said outer panel of said concealment member includes an extension that is mounted on said outer panel of said frame member.

8. A back door structure in accordance with claim 6, in which said inner panel of said concealment member is connected with said inner panel of said frame member by means of bolts.

9. A back door structure in accordance with claim 1, in which said concealment member is plastic.

10. A back door structure in accordance with claim 9, in which said concealment member includes a rib formd on its inside surface.

11. A back door structure in accordance with claim 9, in which said concealment member is connected with said frame member by means of bolts.

12. A back door structure for a motor vehicle as in claim 1, wherein said rear pillar and said back door are sealed by sealing means located on said rear pillar so as to abut said frame member.

13. A back door structure for a motor vehicle as in claim 1, wherein said stay damper is disposed outside of said frame member in a closed position of said back door.

14. A back door structure for a motor vehicle comprising:
   a vehicle body having a rear pillar defining a back door opening of a trapezium configuration;
   a back door hingedly mounted on an upper part of said vehicle body for movement between an open and a closed position;
   said back door being of trapezium configuration with its lower portion wider than its upper portion and adapted in the closed portion to cover and secure said back door opening;
   a stay damper pivotally connected with said back door at one end and pivotally connected with a rear pillar of the vehicle body at its other end to bias said back door to a raised open position and being disposed between said rear pillar and said back door in the closed position of said back door;

said stay damper moving outwardly in accordance with the movement toward the open position of the back door;

said back door including a back door window glass, a frame member having a closed cross-section disposed along the inner surface of a side peripheral edge of the back door window glass, and a concealment member connected with said frame member and extending outwardly around the rear corners of the vehicle body to conceal both said stay damper and said rear pillar and to constitute a portion of the outer surface of said vehicle body;

said frame member including an outer panel and an inner panel, with an outer edge of said outer panel formed with an extension, and said concealment member including an inner panel connected with said extension and an outer panel mounted on the outer panel of said fame member.

15. A back door structure for a motor vehicle comprising:

a vehicle body having a rear pillar defining a back door opening of a trapezium configuration;

a back door hingedly mounted on an upper part of said vehicle body for movement between an open and a closed position;

said back door being of trapezium configuration with its lower portion wider than its upper portion and adapted in the closed portion to cover and secure said back door opening;

a stay damper pivotally connected with said back door at one end and pivotally connected with a rear pillar of the vehicle body at its other end to bias said back door to a raised open position and being disposed between said rear pillar and said back door in the closed position of said back door;

said stay damper moving outwardly in accordance with the movement toward the open position of the back door;

said back door including a back door window glass, a frame member having a closed cross-section disposed along the inner surface of a side peripheral edge of the back door window glass, and a concealment member connected with said frame member and extending outwardly around the rear corners of the vehicle body to conceal both said stay damper and said rear pillar and to constitute a portion of the outer surface of said vehicle body, said concealment member having a closed cross-section, said frame member including an outer panel and an inner panel, and said concealment member including an inner panel connected with said inner panel of said frame member, and an outer panel mounted on the outer panel of said frame member.

16. A back door structure in accordance with claim 15, in which said outer panel of said concealment member includes an extension that is mounted on said outer panel of said frame member.

17. A back door structure in accordance with claim 15, in which said inner panel of said concealment member is connected with said inner panel of said frame member by means of bolts.

18. A back door structure for a motor vehicle comprising:

a vehicle body having a rear pillar defining a back door opening of a trapezium configuration;

a back door hingedly mounted on an upper part of said vehicle body for movement between an open and a closed position;

said back door being of trapezium configuration with its lower portion wider than its upper portion and adapted in the closed position to cover and secure said back door opening;

a stay damper pivotally connected with said back door at one end and pivotally connected with a rear pillar of the vehicle body at its other end to bias said back door to a raised open position and being disposed between said rear pillar and said back door in the closed position of said back door;

said stay damper moving outwardly in accordance with the movement toward the open position of the back door;

said back door including a back door window glass, a frame member having a closed cross-section disposed along the inner surface of a side peripheral edge of the back window glass, an outer edge of the frame member being substantially disposed inside the outer edge of the back door window glass, and a concealment member connected with said frame member and extending outwardly around the rear corners of the vehicle body to conceal both said stay damper and said rear pillar and to constitute a portion of the outer surface of said vehicle body;

said concealment member having a closed cross-section and said frame member including an outer panel and an inner panel, with an outer edge of said outer panel formed with an extension, said concealment member including an inner panel connected with said extension and an outer panel mounted on the outer panel of said frame member.

19. A back door structure for a motor vehicle comprising:

a vehicle body having a rear pillar defining a back door opening of a trapezium configuration;

a back door hingedly mounted on an upper part of said vehicle body for movement between an open and a closed position;

said back door being of trapezium configuration with its lower portion wider than its upper portion and adapted in the closed position to cover and secure said back door opening;

a stay damper pivotally connected with said back door at one end and pivotally connected with a rear pillar of the vehicle body at its other end to bias said back door to a raised open position and being disposed between said rear pillar and said back door in the closed position of said back door;

said stay damper moving outwardly in accordance with the movement toward the open position of said back door;

said back door including a back door window glass, a frame member having a closed cross-section disposed along the inner surface of a side peripheral edge of the back window glass, an outer edge of the frame member being substantially disposed inside the outer edge of the back door window glass, and a concealment member connected with said frame member and extending outwardly around the rear corners of the vehicle body to conceal both said stay damper and said rear pillar and to constitute a portion of the outer surface of said vehicle body;

said concealment member having a closed cross-section and said frame member including an outer panel and an inner panel, said concealment member including an inner panel connected with said inner panel of said frame member, and an outer panel mounted on said outer panel of said frame member.

* * * * *